(12) United States Patent
Blad

(10) Patent No.: US 6,675,067 B2
(45) Date of Patent: Jan. 6, 2004

(54) COMPUTER NETWORK BASED COIN-OPERATED MACHINE MONITORING SYSTEM

(76) Inventor: Steven J. Blad, 2454 Ram Crossing, Henderson, NV (US) 89014

( * ) Notice: Subject to any disclaimer, the term of this patent is extended or adjusted under 35 U.S.C. 154(b) by 149 days.

(21) Appl. No.: 09/801,689

(22) Filed: Mar. 9, 2001

(65) Prior Publication Data

US 2001/0048374 A1 Dec. 6, 2001

Related U.S. Application Data

(60) Provisional application No. 60/202,148, filed on May 5, 2000, and provisional application No. 60/188,092, filed on Mar. 9, 2000.

(51) Int. Cl.[7] .............................................. G06F 17/00
(52) U.S. Cl. ...................... 700/244; 700/236; 700/241
(58) Field of Search ................................. 700/236, 241, 700/244; 705/28

(56) References Cited

U.S. PATENT DOCUMENTS

| | | | |
|---|---|---|---|
| 4,766,548 A | | 8/1988 | Cedrone et al. |
| 5,091,713 A | | 2/1992 | Horne et al. |
| 5,142,694 A | | 8/1992 | Jackson et al. |
| 5,207,784 A | * | 5/1993 | Schwartzendruber ........ 221/14 |
| 5,526,401 A | | 6/1996 | Roach, Jr. et al. |
| 5,909,493 A | * | 6/1999 | Motoyama .................... 713/154 |
| 5,963,452 A | * | 10/1999 | Etoh et al. ..................... 700/231 |
| 5,980,090 A | * | 11/1999 | Royal, Jr. et al. ............. 700/241 |
| 6,003,070 A | | 12/1999 | Frantz |
| 6,052,629 A | * | 4/2000 | Leatherman et al. ......... 700/241 |
| 6,167,358 A | | 12/2000 | Othmer et al. |
| 6,181,981 B1 | | 1/2001 | Varga et al. |
| 6,230,150 B1 | * | 5/2001 | Walker et al. ................ 700/241 |
| 6,259,956 B1 | * | 7/2001 | Myers et al. .................. 700/244 |

* cited by examiner

Primary Examiner—Gene O Crawford
(74) Attorney, Agent, or Firm—Siemens Patent Services, LC

(57) ABSTRACT

There is provided a system for remotely monitoring coin-operated machines. Data from the machines is collected and transmitted by the machine to a remote server. In alternate embodiments, several machines may be interconnected via a LAN to a local CPU which transmits data to the remote server, typically using the internet. The combination of one or more remote machines and the central monitoring site form a Virtual Private Network (VPN). An optional feature allows for e-mail or other type of alert messages to be sent from the remote server in response to the identification of one or more predetermined events for which a customer should immediately be notified. Browse and query tools working against a database of machine information are provided so that authorized customers or other interested parties may view data for individual or groups of coin-operated machines by means of a web page accessed via the internet.

42 Claims, 3 Drawing Sheets

COMPUTER NETWORK BASED COIN-OPERATED MACHINE MONITORING SYSTEM

RELATED APPLICATIONS

The present application is Continuation-in-Part Application claiming priority in accordance with 37 C.F.R. §1.78 from Provisional Applications, Serial Nos. 60/188,092, filed Mar. 9, 2000 and 60/202,148, filed May 5, 2000,

BACKGROUND OF THE INVENTION

1. Field of the Invention

The present invention relates to monitoring coin-operated machines, and, more specifically, to monitoring a number of coin-operated machines from a remote location via a computer network and/or the internet.

Owners/operators of coin-operated machines, typically vending machines and the like, are constantly plagued by the problem of providing adequate service to the machine, tracking the profitability of a machine or group of machines, determining the buying/usage habits of patrons of a particular machine, etc. By having up-to-date information about their machines, operators can optimize their service schedules and product offerings, detect problems or tampering attempts, detect machine malfunctions such as coin or bill jams, determine the quantities of products remaining and log purchases by date and time. The list of possibilities is seemingly endless, but the bottom line is that the operator, with current machine data, can probably keep his or her machines "on line" a high percentage of the time, thereby potentially maximizing profits. However, typically, vending or other coin-operated machines are visited on a periodic, routine basis by a service person who conducts an inventory of the products sold, replenishes the stock, checks the machines for malfunctions, and collects the deposited money. Because every machine will have a different history, some machines could have been devoid of product for a period of time before the scheduled visit by a service person while other machines may have been utilized only sporadically and need less frequent attention. In addition, malfunctions in the machine, such as coin or bill jams, create a loss of goodwill as well as revenue, and may increase the risk of vandalism to the machine by an angry customer. Ideally, the service frequency for each machine will occur just prior to the machine having vended all of its stock, regardless of the frequency of use.

With up-to-date information for each machine, malfunctions my be corrected sooner than if a route service person simply finds the problem on his next routine visit to the machine, possibly several days after the problem occurred. A service person could also be prepared with the correct amount of inventory with which to replenish the machine. High activity machines could receive the attention they deserve while low activity machine could receive less frequent attention.

In gaming (i.e., slot machines or the like) or arcade-type coin operated machines, change machines, coin laundry machines as well as other types of coin-operated machine, keeping the machines up and running is also important to maintain profitability and good will.

Having a system whereby a coin-operated machine operator can remotely determine the operating status, inventory level, etc., of one or more machines becomes highly desirable. The widespread availability of the internet has made this more practical than has heretofore been possible. In addition, a system which can, under certain predetermined circumstances, notify the operator via e-mail, fax, beeper, or the like of a problem demanding immediate attention would be highly attractive.

2. Description of the Prior Art

The problem of remotely monitoring vending or other coin operated machines is not new. To date, many solutions have been proposed. However, none of the solutions provided heretofore are seen to have the inherent advantages of the system of the present invention.

U.S. Pat. No. 5,091,713 for INVENTORY, CASH, SECURITY, AND MAINTENANCE CONTROL APPARATUS AND METHOD FOR A PLURALITY OF REMOTE VENDING MACHINES, issued Feb. 25, 1992, to Arthur H. Horne, et al., provides one such solution. HORNE, et al. equip a vending machine with several sensing systems to monitor inventory level, sense machine malfunctions and detect vandalism. Each machine is configured to communicate via a standard dial-up telephone connection. The HORNE, et al. apparatus also includes a credit card verification mechanism. Two-way voice communication is possible between a patron of the remote vending machine and a central monitoring site. Telephone communication is maintained constantly and personnel are required to be on duty in the central monitoring facility to interact with the machines or users thereof.

In contradistinction, the inventive system utilizes a highly automated central monitoring system. Both individual coin-operated machines and/or groups of coin-operated machines linked to one another and/or a group controller may contact the central monitoring site on an as needed basis (i.e., may dial in when there is data to be transmitted). In addition, the inventive system may be polled from a central computer and periodically transmit stored data to the central computer system upon command. The inventive system also includes a database system wherein data from individual and related groups of machines is analyzed and provided via a web page to authorized users. Authorized users may determine the status of any or all of their machines and may, in interactive mode, modify the data or even reprogram operation of the data collection system. Finally, the inventive system provides an alert sub-system whereby as certain predetermined events are reported by a machine, an e-mail message, a page, fax, or similar real-time alert may be sent to an appropriate person. If a response is not received from the notified person within a predetermined time, the alert may be repeated or the transmission mechanism may be switched. The alert function is particularly useful for machine events that involve malfunction or vandalism.

U.S. Pat. No. 6,003,070 for E-MAIL SYSTEM AND INTERFACE FOR EQUIPMENT MONITORING AND CONTROL, issued Dec. 14, 1999, to Robert H. Frantz, teaches a system wherein individual coin-operated machines may generate e-mail messages. Each e-mail message is specific to a particular event or condition in the individual machine. In addition, the FRANTZ system allows e-mail responses to be received by the coin-operated machines which translate the messages and perform an operation in response to a message.

The inventive system, on the other hand, utilizes e-mail messages as one potential alert vehicle. Unlike the FRANTZ system, the messages in the inventive system are generated by the central monitoring site in response to data representative of certain remote machine conditions or events. There is no communication to an individual machine by e-mail message in the inventive system.

U.S. Pat. No. 4,766,548 for TELELINK MONITORING AND REPORTING SYSTEM, issued Aug. 23, 1988 to Louis A. Cedrone, et al., teaches another telephone-based reporting system. CEDRONE, et al., rely on a non-dedicated telephone connection whereby their microprocessor-based machines may periodically report stored status information to a remote site by use of built-in modems.

The inventive system is designed for retrofitting into existing mechanical and/or electronic coin-operated machines. While the inventive data collection unit may be utilized with a microprocessor-based coin-operated machine, it is also readily adapted for use in older, mechanical coin-operated machines by providing analog input for monitoring devices within the machine, such as triggers, switches, counters, etc. It may also have digital input ports for connection to digital or electrical signal lines in electronic and/or hybrid coin-operated machines. CEDRONE, et al. teach none of the sophistication of the central monitoring portion of the invention. No web page server is present whereby a customer's service person or other authorized person may access individual or group machine data via the internet from anywhere in the world where the internet may be accessed.

U.S. Pat. No. 6,167,358 for SYSTEM AND METHOD FOR REMOTELY MONITORING A PLURALITY OF COMPUTER-BASED SYSTEMS, issued Dec. 26, 2000, to Konstantin Othmer, et al., teaches a system for remotely monitoring the operation of computer-based systems connected to a central server. The system is particularly useful for monitoring the operation of a software product being debugged on a plurality of remote workstations (i.e., computers). The OTHMER, et al., system does include provisions for the automatic generation of e-mail messages by the central server as well as a bug tracking and customer service data base with browse and query tools available to manipulate the database.

Unlike the inventive system, there is no scaled alert system whereby fax, pager, telephone, etc. may be used as an alternative to e-mail or as ancillary method of communication in the event that a user does not make a timely response to an e-mail. Also, the browse and query tools are not available via web page to authorized users via the internet. The system does not directly apply to coin-operated machines, especially to remote groups of machines arranged on their own LANs.

U.S. Pat. No. 5,142,694 for REPORTING UNIT, issued Aug. 25, 1992, to Brett A. Jackson, et al., teaches a method for optimized coverage for devices utilizing radio frequency (RF) signals for data communication and reporting. JACKSON, et al., teach the use of an RF link but are silent on any details concerning the generation of data within a coin-operated machine and do not teach any elements of the sophisticated central monitoring facility of the instant invention.

U.S. Pat. No. 5,526,401 for METHODS AND APPARATUS FOR ACKNOWLEDGING A PAGING MESSAGE VIA A CELLULAR PHONE NETWORK CONTROL CHANNEL, issued Jun. 11, 1996, to Peter O. Roach, Jr., et al., teaches details of the use of the cellular phone network for data communication including acknowledgment routines. While the type of communication methodology taught by ROACH, Jr., et al., could be used for a data transmission element in the inventive system, there is no teaching of any of the many inventive concepts and elements of the central monitoring site present.

U.S. Pat. No. 6,181,981 for APPARATUS AND METHOD FOR IMPROVED VENDING MACHINE INVENTORY MAINTENANCE, issued Jan. 30, 2001, to Steve Varga, et al., teaches a system wherein a plurality of vending machines are linked to a central monitoring facility. Inventory and status information is transmitted from the machines or groups of machines to the central site via a telephone or radio modem link. Information analyzed at the central site allows dispatch of appropriate service personnel when a machine requires attention.

VARGA, et al., however, neither disclose nor suggest the sophisticated database server, the web server, or the alert server of the instant invention. Neither do VARGA, et al., teach a data collection unit suitable for inclusion in an existing coin-operated machine. The VARGA, et al., system is also limited strictly to vending machines unlike the system of the present invention which finds utility when used with any type of coin-operated machine. Finally, no data communication utilizing the internet is taught or suggested, nor is data encrypted.

None of the above inventions and patents, taken either singly or in combination, are, however, seen to anticipate or suggest the instant invention as claimed.

SUMMARY OF THE INVENTION

The present invention relates to a system and method for remotely monitoring the operation and/or status of at least one coin-operated (e.g., vending) machine. Data from the coin-operated machine is collected and either transmitted by the individual machine to a remote server, or, in an alternate embodiment, data is collected by a local group controller (e.g., a PC or other CPU) which is connected to the coin-operated machines via a LAN or other similar network. Data from multiple machines is then transmitted to the remote server by the local group controller. Data transmission, whether from individual machines or groups of machines on a LAN is typically via the internet. The combination of one or more remote machines and the central monitoring site form a Virtual Private Network (VPN). An optional feature, operative with any embodiment of the inventive system, allows for e-mail or other type of alert messages to be sent from the central monitoring site in response to the identification of one or more predetermined events for which a customer should be immediately notified. A scalable alert scheme with escalating retransmission and alternate alert methods is provided. Browse and query tools working against a database of machine information are provided so that authorized customers or other interested parties may, via a web page accessed from the internet, view and possibly modify data for individual or groups of coin-operated machines. Finally, a web server is provided upon which the aforementioned web page is posted. The web page allows authorized customers or other authorized persons to browse and/or query the database from essentially anywhere in the world, via the internet. An optional interactive mode, whereby the user may actually modify the data or the query statements, may also be provided on the web page.

Accordingly, it is a principal object of the invention to provide a remote monitoring system for one or more coin-operated machines.

It is another object of the invention to provide a remote monitoring system for one or more coin-operated machines wherein predetermined events and/or conditions within a coin-operated machine are logged and data representative of these events or conditions is transmitted to a remote central monitoring site.

It is a further object of the invention to provide a remote monitoring system for one or more coin-operated machines wherein individual coin-operated machines may communicate directly with a remote central monitoring site.

Still another object of the invention is to provide a remote monitoring system for one or more coin-operated machines wherein multiple coin-operated machines are arranged on a local area network (LAN) with a CPU and wherein combined data for all machines on the LAN is communicated to a remote central monitoring site by the CPU.

An additional object of the invention is to provide a remote monitoring system for one or more coin-operated machines wherein data communicated between the coin-operated machines and the central monitoring site is encrypted for transmission.

It is again an object of the invention to provide a remote monitoring system for one or more coin-operated machines which includes data collection units adapted for installation inside an existing coin-operated machine.

It is a still further object of the invention to provide a remote monitoring system for one or more coin-operated machines wherein the data collection units include both analog and digital data inputs which may be connected to existing triggers, switches and data signals within either mechanical and electronic coin-operated machines.

It is an additional object of the invention to provide a remote monitoring system for one or more coin-operated machines wherein data communication between the coin-operated machine and the central site is by means of the internet.

It is a further object of the invention to provide a remote monitoring system for one or more coin-operated machines wherein a database of machine information at a central site may be browsed or queried by authorized persons by a web page accessed through the internet for any location having internet access.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

The present invention relates to remotely monitoring one or more coin-operated machines using a computer network. Three embodiments of the inventive system are provided. In all embodiments a virtual private network (VPN) is created using the internet to allow transmission of machine data to a server at a central site. In the first embodiment, a data collection unit located within each coin-operated machine connects directly to the internet, typically using a dial-up connection, and establishes the VPN. In the second embodiment, a plurality of machines are locally networked. A group CPU or central data collection unit gathers data from individual coin-operated machines on the network and then connects to the internet, establishes the VPN, and transmits data for all machines to the server at the central site. In the third embodiment, a group controller/CPU is equipped with a data collection interface (e.g., a data input card having analog and/or digital data ports). Signals from each coin-operated machine are connected to the ports of the data input ports. This embodiment avoids the need for equipping each coin-operated machine with its own data collection unit.

Figure 1:
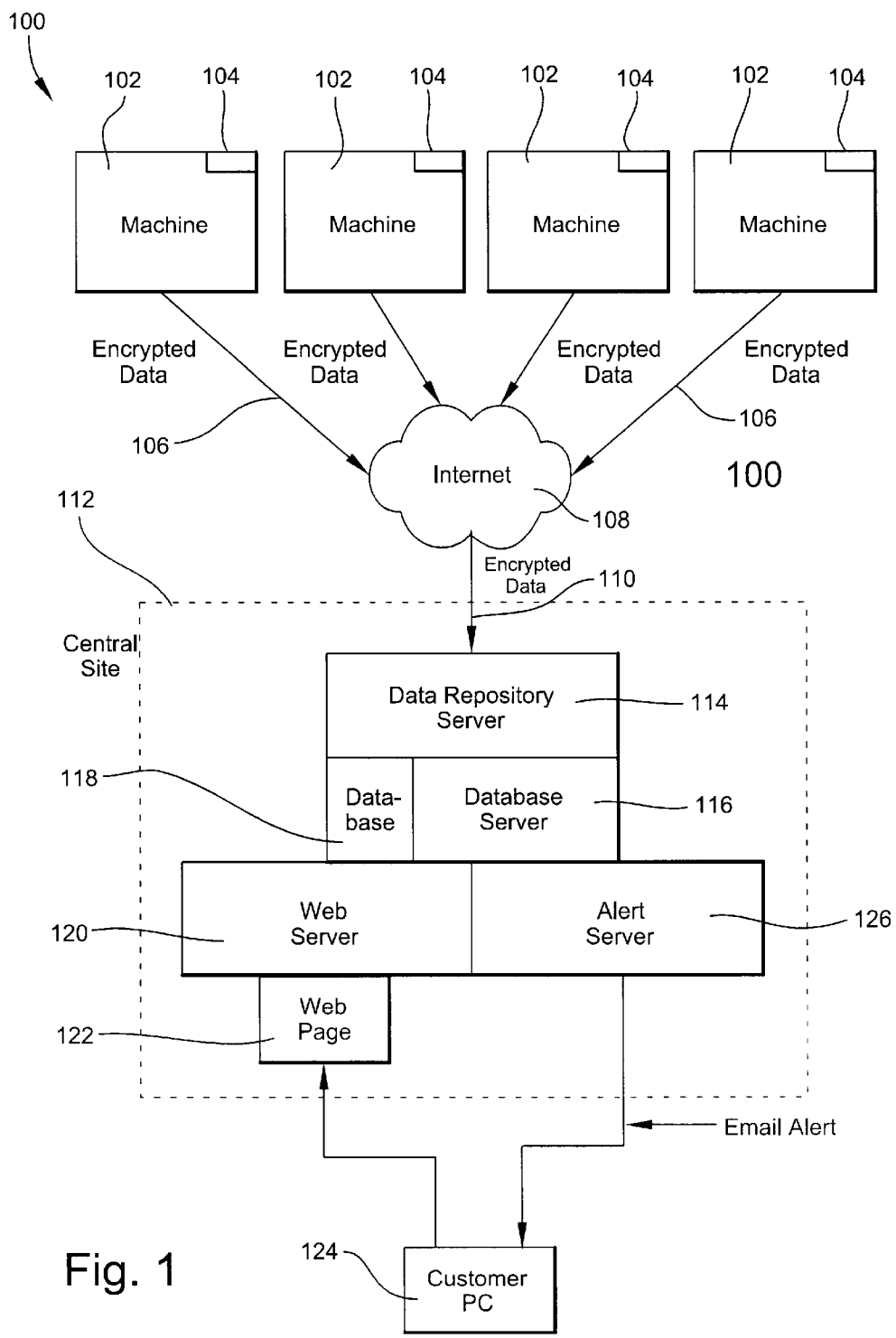
FIG. 1 is a schematic, system block diagram of a first embodiment of the coin-operated machine monitoring system of the invention.

Referring first to FIG. 1, there is shown a system schematic block diagram of the first embodiment, generally at reference number 100. The overall system 100 typically includes at least one coin-operated machine 102 which needs to be monitored. Coin-operated machines 102 may be any coin, token, scrip, bill, card, or "Fastpass" operated machines. Typical examples of such machines are: arcade machines, gaming machines (e.g., slot machines, etc.), soda machines, clothes washers and dryers, cigarette machines, food vending machines, change machines, etc. The term "coin-operated machine" will be used herein to refer to any coin, token, bill, scrip, credit card, etc. operated machine. The specific type of coin-operated machine forms no part of the present invention, which may be used with any such machine. It should also be understood that the coin-operated machines 102 may be mechanical machines that have analog electrical devices (e.g., switches, counters, triggers) which can provide electrical signals in response to a condition or event within the coin-operated machine 102. For example, in a soda vending machine there are typically lights or other indicators showing when stock of a particular brand or flavor of soda is exhausted, when correct change is required, as well as other similar conditions. These existing indicators, switch contacts, etc., present in the coin-operated machine are referred to as existing triggers. The system of the present invention can monitor any or all of these existing triggers so that the owner, operator, or other authorized interested party may monitor the status of the coin-operated machine 102 from a remote location.

In the alternative, coin-operated machine 102 may be an electronic or electrical device wherein signals (i.e., existing triggers) are provided directly from the machine's circuitry. Finally, it should be obvious that hybrid machines having a mixture of analog and electrical/electronic devices may be used with the monitoring system of the present invention.

A data collection unit 104, typically located within coin-operated machine 102, is provided to collect the required data from various components and subsystems of coin-operated machine 102. Data collection unit 104 must typically be physically small enough to be mounted in an available space in the coin-operated machine 102. Data collection unit 104 will typically use a microprocessor (not shown) and will include a memory device (not shown) for storing information about machine conditions and events until the information may be transmitted to a remote central monitoring site 112. Data collection unit 104 typically contains multiple input ports (i.e., "sockets") (not shown) adapted to interface with devices and/or signals in coin-operated machine 102. These input ports may be either analog or digital ports, the number and type of ports being chosen to meet a particular operating environment or circumstance, each input port being operatively connected to an individual device or signal in machine 102. Typical devices and/or conditions which may be monitored include: triggers or switches on the coin drop or bill validator doors, environmental sensors (e.g., temperature), product stock status, detected tampering, out of change, door open, coin/bill received, product dispensed, temperature changed, machine paid out, coin/bill jam, etc. It will be obvious that each class or type of coin-operated machine could have a unique set of conditions and/or events which could be monitored. The system of the present invention is capable of monitoring any mix of these conditions and/or events.

Data collection unit 104 also includes a communications interface (not shown) which allows transmission of data representative of these or similar conditions to a central monitoring site 112. A wide variety of data transmission media (e.g., data communications buses, etc.) and formats may be used. Data collection unit 104 will typically be equipped with a modem (not shown) attached to a telephone circuit (not shown). Data transmission may be accomplished in a number of different ways. For example, data collection unit 104 may initiate a phone call to an Internet Service Provider (ISP) immediately upon receiving data about an event or a condition. In alternate embodiments, data collection unit 104 may store data and periodically initiate a phone call. In still other embodiments, data collection unit 104 may store data until polled (i.e., called) by the central monitoring site.

Data 106 typically consists of a unique machine identification code as well as time and date (time stamp) information in addition to substantive data representing a machine event or condition. The unique machine ID code may be preprogrammed into firmware within data collection unit 104.

Typically, data encryption will be used to protect data 106 being transmitted by data collection unit 104 in machines 102. Typically, encryption will be done by using keys (public and private). Each data collection unit 104 may have an encryption key within its firmware. Software at central site 112 is adapted to decrypt the data when it is received. Standard 128-bit or any other known encryption strategy may be used. Because two-way communication between central site 112 and coin-operated machines 102 is possible, a reverse key arrangement may also be provided.

In a typical example of operation, as a product is dispensed from coin-operated machine 102, a trigger (typically an existing trigger) is actuated that sends a signal to data collection unit 104. Depending upon the manner of implementation, data collection unit 104 may immediately transmit data, typically including a machine identification code and a time stamp to central site 112. In the alternative, the data may be stored for later transmission, either initiated by data collection unit 104 or upon polling by central site 112. Modalities wherein transmission is initiated by an event are typically called interrupt driven (i.e. "push") modalities. Polling modalities wherein data communication is initiated at central site 112 are called "pull" modalities.

A central site 112, typically located remotely from coin-operated machines 102, is provided to receive data from coin-operated machines 102 via a data communications link 106, 108, 110. In the embodiment chosen for purposes of disclosure, each individual coin-operated machine 102 provides output data 106. A data interface, typically a telephone dial-up connection, is provided whereby each coin-operated machine 102 may establish communication with the internet 108 through a local ISP (not shown). Data 110, representative of data from a plurality of coin-operated machines 102, is received at central site 112. Optionally, data 106 may be encrypted using any well known encryption strategy.

Central site 112 is provided with a plurality of modems (not shown) or another equivalent data receiving apparatus well known in the data communications arts. Sufficient reception channels must be provided to handle the data traffic. Actual data traffic loads will be dependant upon multiple factors including the number of coin-operated machines 102 potentially transmitting at a given time, individual message lengths and the overall traffic volume generated by the particular mix of coin-operated machines 102.

A data repository server 114 is operatively connected to the modems (not shown) as well as to database server 116. Data repository server 114 receives, decrypts (if necessary) and retains raw data from a plurality of remote coin-operated machines 102. The raw data typically containins a machine ID, a time stamp, coin drop information, or other similar information from the remote coin-operated machines 102 as may have been preselected, for further processing and analysis. Data repository server 114 may be implemented on a computer platform typically using an operating system such as Microsoft Windows NT, Microsoft Windows 2000, Unix or Linux. The choice of operating system forms no part of the instant invention and may be varied to meet a particular operating requirement or environment.

Database server 116 receives raw data from data repository server 114 and extracts, filters, processes and formats the individual data records from coin-operated machines 102, ultimately storing the data records in their final form in a database 118 operatively connected to database server 116. It is assumed that database server 116 is implemented using commercially available database software such as Interbase, Oracle, or other such software well known to those skilled in the art, on a computer platform utilizing a suitable operating system such as Microsoft Windows NT, Microsoft Windows 2000, Unix, Linux, etc. The inventive system is not considered limited to the choice of either database or operating system software.

Central site 112 also includes a web server 120 which runs active queries on the data within database 118 and posts the results of the queries on a secure web page 122 for viewing by authorized individuals. Access to web page 122 is typically from a customer's personal computer (PC) 124 which is adapted for internet access in a manner well known to those skilled in the art. Web page design and implementation are also well known to those skilled in the art. Web page 122 may be designed for either passive mode (i.e., the user can only view data) or active mode wherein the user may change filters, structure queries, or otherwise manipulate the data present on web page 122. Ideally, web page 122 should be designed so that a user may view data for either individual coin-operated machines 102, or for a plurality of coin-operated machines 102. If required, encryption, as well as other access security measures, may be implemented to limit access to web page 122 thereby ensuring the confidentiality of the data present thereupon. Because the internet is used to connect a customer PC 124 to web server 120 and web page 122, access is possible from anywhere in the world that internet access is available. The advent of small, hand-held mobile web access devices also allows a customer to be in substantially constant communication with one or more coin-operated machines 102 regardless of the customer's location.

Central site 112 also contains alert server 126 which is connected to and operates cooperatively with database server 116. When predetermined conditions are identified by alert server 126, a real-time message is sent to the customer or other interested party informing them of the condition. Alert server 126 can provide the alert in a number of ways such as e-mail, fax, telephone, pager, or the like. The embodiment shown in FIG. 1 assumes an e-mail alert will be generated by alert server 126. When a predetermined event occurs, for example, a coin-operated machine 102 runs out of a product, a trigger within machine 102 initiates transmission of a message to central site 112. The message typically contains the machine ID, a time stamp, and a description of the event, in this case that the machine's product inventory is exhausted. The message is received by data repository server 114 at central site 112 and is then processed by data base server 116. Because the product exhausted event fits a predetermined criteria for generating an alert, alert server 126 generates and sends an e-mail message to the customer's PC 124 informing them of the product exhausted status. This allows immediate action to be taken by the customer (or other interested party) to rectify the situation. Because the length of the alert e-mails is short, it is assumed that substantially immediate processing and transmission of the messages by alert server 126 is possible. Alert server 126 may be equipped with an appropriate number of individual modems (not shown) for connection to an internet e-mail service. In alternate embodiments, a high bandwidth connection such as DSL, cable modem, T1, or other such connection method well know to those skilled in the data communication arts could be utilized.

Alert server 126 utilizes a scalable alert structure wherein a multi-level response to an alert situation may be generated. In the embodiment chosen for purposes of disclosure, alert server 126 is programmed to expect a response from the e-mail recipient within a predetermined amount of time. If no response is received, alert server 126 may resend the e-mail alert, or send the alert information via a different medium such as pager or fax. It should be obvious that a wide variety of choices could be made depending upon unique operating environments and circumstances and that any arrangement of alert notification/acknowledgment strategies is deemed to be within the scope of the invention.

Figure 2:
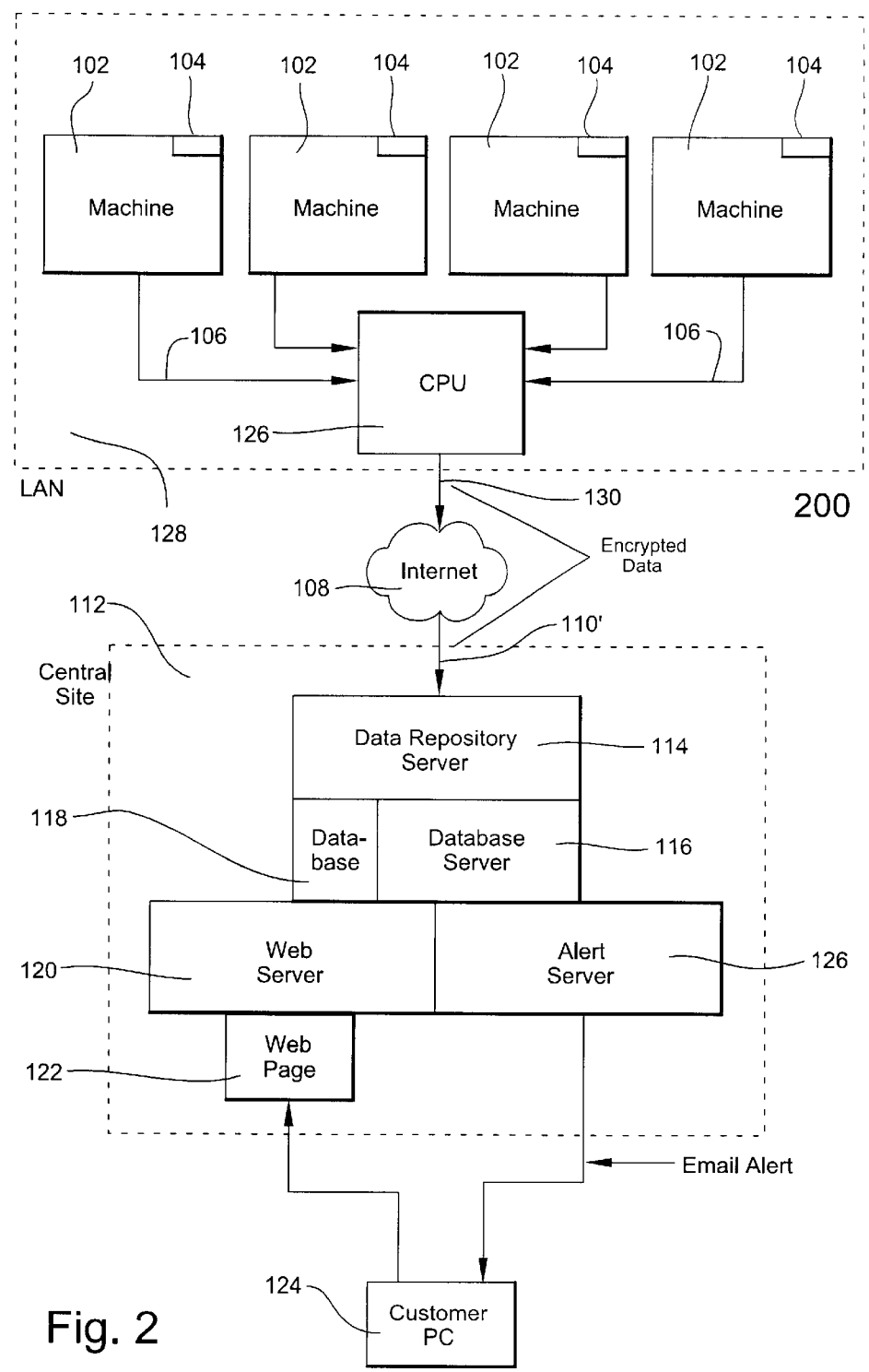
FIG. 2 is a schematic, system block diagram of an alternate embodiment of the inventive system.

Referring now to FIG. 2, there is shown a schematic system block diagram of an alternate embodiment of the communications and monitoring system of the present invention. In this embodiment, each of a plurality of coin-operated machines 102 is equipped with a data collection unit 104. No data collection unit 104, however, has a built-in modem but rather has a communications interface such as a network interface (not shown) adapted to communicate with a local CPU 126 via local area network (LAN) 128. Communication between CPU 126 and coin-operated machines 102 may be by any of the data network topologies which are well known to those skilled in the art. The network speed requirement for LAN 128 is typically minimal unless there are large number of machines 102 present on the network. Ethernet would be one suitable choice because of its relatively low cost and widely available components. Either an interrupt-driven or a polled operation may be used to communicate data 106 from machines 102 to CPU 126 over LAN 128. CPU 126 may store data for periodic, batch transmission to central site 112. In other embodiments, CPU 126 may transmit data 106 from any connected coin-operated machines 102 as data 106 is received at CPU 126 or transmit stored data when polled by central site 112.

The requirements for CPU 126 are dependent upon, among other factors, the number of machines 102 attached to LAN 128. CPU 126 may range from a very simple, inexpensive personal computer with a simple LAN interface to a rather sophisticated system with advanced input/output (I/O) devices. CPU 126 may use any well-known operating systems such as Microsoft Windows NT, Microsoft Windows 2000, UNIX or Linux. It is anticipated that a proprietary software program meeting the specific needs of the monitoring system will be used. The creation and operation of such software is well know to those skilled in the software development arts. It should be obvious that any program, whether off-the-shelf, custom developed, or modified, which can perform the necessary data collection, storage management functions and data transmission functions may be used with the system of the present invention. CPU 126 may, optionally, encrypt data being transmitted to central site 112.

While, in the embodiments chosen for purposes of disclosure, data transmission between individual machines 102 and central site 112 or between CPU 126 and central site 112 are assumed to be performed over the internet, it should be obvious that many other data transmission systems could also be used. For example, private leased line, microwave, satellite, infrared, or laser communications links, RF sub-carrier link, optical fibre links, etc. are a few of the possibilities. The present invention is not considered limited by the method chosen to transmit data from machines 102 and/or CPU 126 to central site 112.

CPU 126 is adapted to access the internet via an ISP and send data 130 which represents a consolidation of individual data stream 106 from coin-operated machines 102. Because each data stream 106 is uniquely identified, the data arriving at central site 112 is indistinguishable from individual data streams 106 as shown in the embodiment shown in FIG. 1. Operation of central site 112 in this embodiment is identical to the operation already described hereinabove with the embodiment of FIG. 1.

The embodiment shown in FIG. 2 is particularly useful when there is a relatively large number of machines 102 in relatively close proximity to one another and where it would be both costly and is impractical to provide each of the machines 102 with an individual modem and telephone line to communicate with central site 112.

Figure 3:
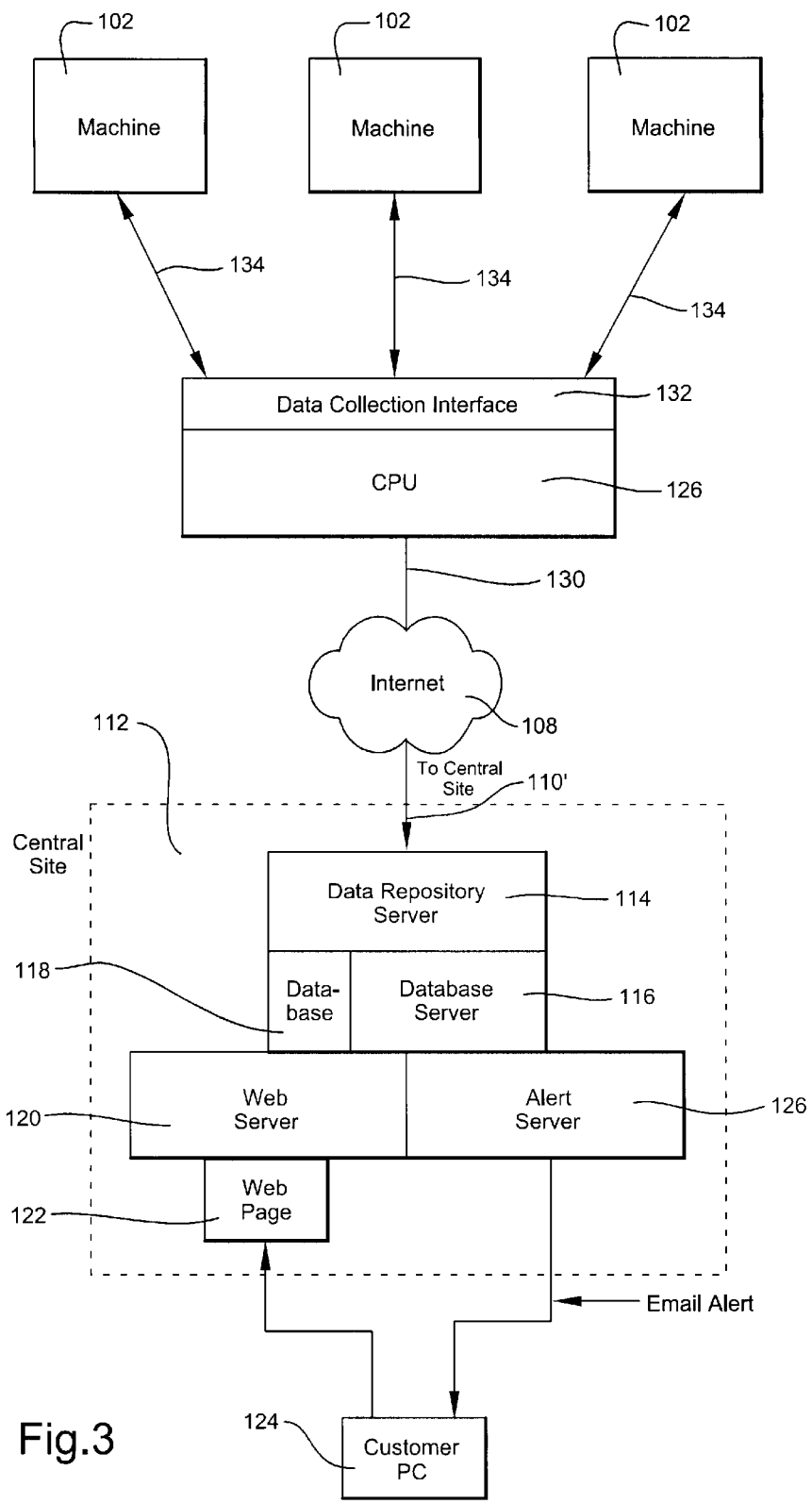
FIG. 3 is a schematic, system block diagram of a portion of a third embodiment of the inventive system.

Referring now to FIG. 3, there is shown a schematic system diagram of a third embodiment of the inventive system. A plurality of coin-operated machines 102 are connected to a data collection interface 132 via cables 134. In this embodiment, no data collection units 104 (FIGS. 1, 2) are installed in coin-operated machines 102. Rather, individual signal lines connected to triggers, switches, etc. within the machines 102 are routed to data collection interface 132. Data collection interface 132 is typically a multi-channel device having a mix of analog and digital input ports and, when required, digital-to-analog converters (DACs). Many devices suitable for this application are well known to those skilled in the data collection arts. These devices may be external to CPU 126 or may be packaged on plug-in cards located within CPU 126. In the embodiment of FIG. 3, the individual data collection units 104 are eliminated and their functions performed centrally at CPU 126 in cooperation with data collection interface 132. While the cost may be lower, the expense of running multiconductor cables may be greater than interconnecting machines 102 to CPU 126 via a LAN as is shown in the embodiment of FIG. 2. The distance between machines 102 and data collection interface 132 may also need to be limited to minimize false signals caused by noise pickup along cables 134. It will be obvious to those skilled in the data collection arts that the embodiment of FIG. 3 may be an inexpensive way to implement the inventive system in certain environments.

It is to be understood that the present invention is not limited to the embodiments described above, but encompasses any and all embodiments within the scope of the following claims.

What is claimed is:

1. A system for remotely monitoring a coin-operated machine, comprising:
   1) a coin-operated machine having at least one event to be remotely monitored;
   2) a data collection unit disposed proximate said coin operated machine and operatively connected thereto and adapted to generate data representative of said at least one event;
   3) interface means operatively connected to said data collection unit and adapted for connecting said data collection unit to an external data communications network and adapted to transmit said data thereupon;
   4) monitoring means located remotely from said coin-operated machine adapted to receive said data from said coin-operated machine via said external data communications bus, said monitoring means being adapted to perform at least one function in response to data received from said coin-operated machine, said monitoring means comprising:
      i) database means adapted to receive and retain said data; and
      ii) query means adapted to allow performing filtering and browsing operations on said retained data and adapted to provide an output from said operations;
   display means operatively connected to said monitoring means for displaying said output; and
   said data encryption means operatively connected to said data collection unit and adapted to encrypt said data prior to transmission to said monitoring means; and
   alert means operatively connected to said database means for matching data from within said retained data to at least one predetermined pattern and for issuing a specific alert message to a predetermined addressee through a first communication channel upon finding a positive match between said at least one predetermined pattern and said retained data,
   said alert message is at least one from the group: e-mail message, fax, voice message and page, and
   wherein said alert means further comprises means for accepting a response from said predetermined addressee and, if within a predetermined time, no response is received, re-issuing said alert message.

2. The system for remotely monitoring a coin-operated machine as recited in claim 1, further comprising:
   e) alert means operatively connected to said database means for matching data from within said retained data to at least one predetermined pattern and for issuing a specific alert message to a predetermined addressee through a first communication channel upon finding a positive match between said at least one predetermined pattern and said retained data.

3. The system for remotely monitoring a coin-operated machine as recited in claim 2, wherein said alert message is at least one from the group: e-mail message, fax, voice message and page.

4. The system for remotely monitoring a coin-operated machine as recited in claim 1, wherein said display means comprises a web page.

5. The system for remotely monitoring a coin-operated machine as recited in claim 4, wherein said web page is adapted to allow manipulation of at least one of said retained data, said browsing and said filtering operations.

6. The system for remotely monitoring a coin-operated machine as recited in claim 5, wherein said web page is accessible via the internet.

7. The system for remotely monitoring a coin-operated machine as recited in claim 1, wherein said coin-operated machine is one from the group: analog machine, digital machine and hybrid machine.

8. The system for remotely monitoring a coin-operated machine as recited in claim 7, wherein said coin-operated machine is adapted to provide at least one trigger in response to an event within said coin-operated machine.

9. The system for remotely monitoring a coin-operated machine as recited in claim 8, wherein said data collection means comprises at least one input port from the group: analog input port and digital input port.

10. The system for remotely monitoring a coin-operated machine as recited in claim 9, wherein an electrical signal representative of said trigger is provided to at least one of said input ports.

11. The system for remotely monitoring a coin-operated machine as recited in claim 10, wherein said data collection means comprises memory adapted to store data representative of said trigger.

12. The system for remotely monitoring a coin-operated machine as recited in claim 11, wherein said data comprises a unique machine identification.

13. The system for remotely monitoring a coin-operated machine as recited in claim 10, wherein said data collection means is located within an enclosure of said coin-operated machine.

14. The system for remotely monitoring a coin-operated machine as recited in claim 13, wherein said data collection unit is adapted to be retrofitted to an existing coin-operated machine.

15. A system for remotely monitoring a plurality of coin-operated machines, comprising:
   a) a plurality of coin-operated machines having at least one function to be remotely monitored, said plurality of coin-operated machines each being operatively connected to a local area network (LAN);
   b) a data collection unit disposed proximate each of said coin operated machines and operatively connected thereto and adapted to generate data representative of a condition in said coin-operated machine;
   c) interface means operatively connected to each of said data collection units and adapted for connecting said data collection units to said LAN and adapted to transmit said data thereupon;
   d) a local CPU operatively connected to said LAN and adapted to receive and store data from each of said plurality of coin-operated machines and adapted for connecting said CPU to an external data communications bus;
   e) monitoring means located remotely from said coin-operated machine adapted to receive said data from said local CPU via said external data communications bus, said monitoring means being adapted to perform at least one function in response to data received from said local CPU, said monitoring means comprising:
      i) database means adapted to receive and retain said data; and
      ii) query means adapted to allow performing filtering and browsing operations on said retained data and adapted to provide an output from said operations;
   display means operatively connected to said monitoring means for displaying said output; and said data encryption means operatively connected to said data collection unit and adapted to encrypt said data prior to transmission to said monitoring means; and alert means operatively connected to said database means for matching data from within said retained data to predetermined patterns and for issuing a specific alert message to a predetermined addressee through a first communication channel upon finding a positive match in said retained data, and said alert means further comprises means for accepting a response from said predetermined addressee and, if within a predetermined time, no response is received, re-issuing said alert message.

16. The system for remotely monitoring a plurality of coin-operated machines as recited in claim 15, further comprising:

f) alert means operatively connected to said database means for matching data from within said retained data to predetermined patterns and for issuing a specific alert message to a predetermined addressee through a first communication channel upon finding a positive match in said retained data.

17. The system for remotely monitoring a plurality of coin-operated machines as recited in claim 16, wherein said alert message is at least one from the group: e-mail message, fax, voice message and page.

18. The system for remotely monitoring a plurality of coin-operated machines as recited in claim 15, wherein said display means comprises a web page.

19. The system for remotely monitoring a plurality of coin-operated machines as recited in claim 18, wherein said web page is adapted to allow manipulation of at least one of said retained data and said filtering operation.

20. The system for remotely monitoring a plurality of coin-operated machines as recited in claim 19, wherein said web page is accessible via the internet.

21. The system for remotely monitoring a plurality of coin-operated machine as recited in claim 15, wherein each of said plurality of coin-operated machines is one from the group: analog machine, digital machine and hybrid machine.

22. The system for remotely monitoring a plurality of coin-operated machines as recited in claim 21, wherein each of said coin-operated machines is adapted to provide at least one trigger in response to a condition within said coin-operated machine.

23. The system for remotely monitoring a plurality of coin-operated machines as recited in claim 22, wherein said data collection means comprises at least one input port from the group: analog input port and digital input port.

24. The system for remotely monitoring a plurality of coin-operated machines as recited in claim 23, wherein an electrical signal representative of said trigger is provided to at least one of said input ports.

25. The system for remotely monitoring a plurality of coin-operated machines as recited in claim 24, wherein said data collection means comprises memory adapted to store data representative of said trigger.

26. The system for remotely monitoring a plurality of coin-operated machines as recited in claim 25, wherein said data includes a unique machine identification.

27. The system for remotely monitoring a plurality of coin-operated machines as recited in claim 24, wherein said data collection means is located within an enclosure of each of said coin-operated machines.

28. The system for remotely monitoring a plurality of coin-operated machines as recited in claim 27, wherein said data collection units are adapted to be retrofitted to an existing coin-operated machine.

29. A system for remotely monitoring a plurality of coin-operated machines comprising:

a) a plurality of coin-operated machines having at least one function to be remotely monitored and adapted to provide an electrical signal representative of said at least one function;

b) a local CPU having at least one data input port adapted to receive said electrical signal and to generate data representative thereof, and adapted for connecting said CPU to an external data communications bus;

c) monitoring means located remotely from said coin-operated machine adapted to receive said data from said local CPU via said external data communications bus, said monitoring means being adapted to perform at least one function in response to data received from said local CPU, said monitoring means comprising:

i) database means adapted to receive and retain said data; and ii) query means adapted to allow performing filtering and browsing operations on said retained data and adapted to provide an output from said operations;

display means operatively connected to said monitoring means for displaying said output; and data encryption means operatively connected to said local CPU and adapted to encrypt said data prior to transmission to said monitoring means; and wherein each of said plurality of coin-operated machines is one from the group: analog machine, digital machine and hybrid machine; and alert means operatively connected to said database means for matching data from within said retained data to predetermined patterns and for issuing a specific alert message to a predetermined addressee through a first communication channel upon finding a positive match in said retained data, and alert means further comprises means for accepting a response from said predetermined addressee and, if within a predetermined time, no response is received, re-issuing said alert message.

30. The system for remotely monitoring a plurality of coin-operated machines as recited in claim 29, wherein said display means comprises a web page accessible via the internet and adapted to allow manipulation of at least one of said retained data and said filtering operation.

31. The system for remotely monitoring a plurality of coin-operated machines as recited in claim 29, wherein each of said plurality of coin-operated machines is one from the group: analog machine, digital machine and hybrid machine.

32. The system for remotely monitoring a coin-operated machine as recited in claim 31, further comprising:

e) alert means operatively connected to said database means for matching data from within said retained data to predetermined patterns and for issuing a specific alert message to a predetermined addressee through a first communication channel upon finding a positive match in said retained data.

33. The system for remotely monitoring a plurality coin-operated machine as recited in claim 32, wherein said alert message is at least one from the group: e-mail message, fax, voice message and page.

34. The for remotely monitoring a plurality of coin-operated machines as recited in claim 30, wherein each of said coin-operated machines is adapted to provide at least one trigger in response to a condition within said coin-operated machine, said trigger comprising an electrical signal applied to an input port of said local CPU.

35. The system for remotely monitoring a plurality of coin-operated machines as recited in claim 33, wherein said local CPU comprises memory adapted to store data representative of said trigger and data corresponding to a unique machine identification.

36. The system for remotely monitoring a plurality of coin-operated machines as recited in claim 34, wherein each of said coin-operated machines have data collection units which are adapted to be retrofitted to an existing coin-operated machine.

37. A system for remotely monitoring a coin-operated machine, comprising:
1) a coin-operated machine having at least one event to be remotely monitored;
2) a data collection unit disposed proximate said coin operated machine and operatively connected thereto and adapted to generate data representative of said at least one event;
3) interface means operatively connected to said data collection unit and adapted for connecting said data collection unit to an external data communications network and adapted to transmit said data thereupon;
4) monitoring means located remotely from said coin-operated machine adapted to receive said data from said coin-operated machine via said external data communications bus, said monitoring means being adapted to perform at least one function in response to data received from said coin-operated machine, said monitoring means comprising:
   i) database means adapted to receive and retain said data; and
   ii) query means adapted to allow performing filtering and browsing operations on said retained data and adapted to provide an output from said operations;
display means operatively connected to said monitoring means for displaying said output
e) alert means operatively connected to said database means for matching data from within said retained data to at least one predetermined pattern and for issuing a specific alert message to a predetermined addressee through a first communication channel upon finding a positive match between said at least one predetermined pattern and said retained data;
wherein said alert message is at least one from the group: e-mail message, fax, voice message and page wherein said alert means further comprises means for accepting a response from said predetermined addressee and, if within a predetermined time, no response is received, re-issuing said alert message; and
wherein said re-issuing said alert message comprises issuing an additional alert message through a different communications channel.

38. A system for remotely monitoring a plurality of coin-operated machines, comprising:
a) a plurality of coin-operated machines having at least one function to be remotely monitored, said plurality of coin-operated machines each being operatively connected to a local area network (LAN);
b) a data collection unit disposed proximate each of said coin operated machines and operatively connected thereto and adapted to generate data representative of a condition in said coin-operated machine;
c) interface means operatively connected to each of said data collection units and adapted for connecting said data collection units to said LAN and adapted to transmit said data thereupon;
d) a local CPU operatively connected to said LAN and adapted to receive and store data from each of said plurality of coin-operated machines and adapted for connecting said CPU to an external data communications bus;
e) monitoring means located remotely from said coin-operated machine adapted to receive said data from said local CPU via said external data communications bus, said monitoring means being adapted to perform at least one function in response to data received from said local CPU, said monitoring means comprising:
   i) database means adapted to receive and retain said data; and
   ii) query means adapted to allow performing filtering and browsing operations on said retained data and adapted to provide an output from said operations;
display means operatively connected to said monitoring means for displaying said output;
f) alert means operatively connected to said database means for matching data from within said retained data to predetermined patterns and for issuing a specific alert message to a predetermined addressee through a first communication channel upon finding a positive match in said retained data;
wherein said alert message is at least one from the group: e-mail message, fax, voice message and page; and
wherein said alert means further comprises means for accepting a response from said predetermined addressee and, if within a predetermined time, no response is received, re-issuing said alert message.

39. A system for remotely monitoring a plurality of coin-operated machines, comprising:
a) a plurality of coin-operated machines having at least one function to be remotely monitored and adapted to provide an electrical signal representative of said at least one function;
b) a local CPU having at least one data input port adapted to receive said electrical signal and to generate data representative thereof, and adapted for connecting said CPU to an external data communications bus;
c) monitoring means located remotely from said coin-operated machine adapted to receive said data from said local CPU via said external data communications bus, said monitoring means being adapted to perform at least one function in response to data received from said local CPU, said monitoring means comprising:
   i) database means adapted to receive and retain said data; and
   ii) query means adapted to allow performing filtering and browsing operations on said retained data and adapted to provide an output from said operations;
d) display means operatively connected to said monitoring means for displaying said output;
wherein each of said plurality of coin-operated machines is one from the group: analog machine, digital machine and hybrid machine;
e) alert means operatively connected to said database means for matching data from within said retained data to predetermined patterns and for issuing a specific alert message to a predetermined addressee through a first communication channel upon finding a positive match in said retained data;
wherein said alert means further comprises means for accepting a response from said predetermined addressee and, if within a predetermined time, no response is received, re-issuing said alert message; and
wherein said re-issuing said alert message comprises issuing an additional alert message through a different communications channel; and wherein said re-issuing said alert message comprises issuing an additional alert message through a different communications channel.

40. A system for remotely monitoring a coin-operated machine, comprising:

1) a coin-operated machine having at least one event to be remotely monitored;
2) a data collection unit disposed proximate said coin operated machine and operatively connected thereto and adapted to generate data representative of said at least one event;
3) interface means operatively connected to said data collection unit and adapted for connecting said data collection unit to an external data communications network and adapted to transmit said data thereupon;
4) monitoring means located remotely from said coin-operated machine adapted to receive said data from said coin-operated machine via said external data communications bus, said monitoring means being adapted to perform at least one function in response to data received from said coin-operated machine, said monitoring means comprising:
   i) database means adapted to receive and retain said data; and
   ii) query means adapted to allow performing filtering and browsing operations on said retained data and adapted to provide an output from said operations;
display means operatively connected to said monitoring means for displaying said output; and
said data encryption means operatively connected to said data collection unit and adapted to encrypt said data prior to transmission to said monitoring means; and
alert means operatively connected to said database means for matching data from within said retained data to at least one predetermined pattern and for issuing a specific alert message to a predetermined addressee through a first communication channel upon finding a positive match between said at least one predetermined pattern and said retained data, and
said alert message is at least one from the group: e-mail message, fax, voice message and page, and
wherein said alert means further comprises means for accepting a response from said predetermined addressee and, if within a predetermined time, no response is received, re-issuing said alert message, and
wherein said re-issuing said alert message comprises issuing an additional alert message through a different communications channel.

41. A system for remotely monitoring a plurality of coin-operated machines, comprising:

a) a plurality of coin-operated machines having at least one function to be remotely monitored, said plurality of coin-operated machines each being operatively connected to a local area network (LAN);
b) a data collection unit disposed proximate each of said coin operated machines and operatively connected thereto and adapted to generate data representative of a condition in said coin-operated machine;
c) interface means operatively connected to each of said data collection units and adapted for connecting said data collection units to said LAN and adapted to transmit said data thereupon;
d) a local CPU operatively connected to said LAN and adapted to receive and store data from each of said plurality of coin-operated machines and adapted for connecting said CPU to an external data communications bus;
e) monitoring means located remotely from said coin-operated machine adapted to receive said data from said local CPU via said external data communications bus, said monitoring means being adapted to perform at least one function in response to data received from said local CPU, said monitoring means comprising:
   i) database means adapted to receive and retain said data; and
alert means operatively connected to said database means for matching data from within said retained data to predetermined patterns and for issuing a specific alert message to a predetermined addressee through a first communication channel upon finding a positive match in said retained data,
wherein said alert message is at least one from the group: e-mail message, fax, voice message and page, and said alert means further comprises means for accepting a response from said predetermined addressee and, if within a predetermined time, no response is received, re-issuing said alert message, and
wherein said re-issuing said alert message comprises issuing an additional alert message through a different communications channel.

42. A system for remotely monitoring a plurality of coin-operated machine, comprising:

a) a plurality of coin-operated machines having at least one function to be remotely monitored and adapted to provide an electrical signal representative of said at least one function;
b) a local CPU having at least one data input port adapted to receive said electrical signal and to generate data representative thereof, and adapted for connecting said CPU to an external data communications bus;
c) monitoring means located remotely from said coin-operated machine adapted to receive said data from said local CPU via said external data communications bus, said monitoring means being adapted to perform at least one function in response to data received from said local CPU, said monitoring means comprising:
   i) database means adapted to receive and retain said data; and
   ii) query means adapted to allow performing filtering and browsing operations on said retained data and adapted to provide an output from said operations;
display means operatively connected to said monitoring means for displaying said output; and data encryption means operatively connected to said local CPU and adapted to encrypt said data prior to transmission to said monitoring means; and
wherein each of said plurality of coin-operated machines is one from the group: analog machine, digital machine and hybrid machine; and
alert means operatively connected to said database means for matching data from within said retained data to predetermined patterns and for issuing a specific alert message to a predetermined addressee through a first communication channel upon finding a positive match in said retained data, and
said alert means further comprises means for accepting a response from said predetermined addressee and, if within a predetermined time, no response is received, re-issuing said alert message, and
wherein said re-issuing said alert message comprises issuing an additional alert message through a different communications channel.

* * * * *